(12) United States Patent
Park et al.

(10) Patent No.: US 10,191,632 B2
(45) Date of Patent: Jan. 29, 2019

(54) INPUT APPARATUS AND MEDICAL IMAGE APPARATUS COMPRISING THE SAME

(71) Applicant: SAMSUNG MEDISON CO., LTD., Hongcheon-gun, Gangwon-do (KR)

(72) Inventors: Dong-Yoon Park, Seoul (KR); Han Eol Kim, Seoul (KR); Dong Hoon Oh, Seoul (KR); Dong Gyu Hyun, Gwangju-Si (KR)

(73) Assignee: SAMSUNG MEDISON CO., LTD., Hongcheon-gun, Gangwon-do (KR)

( * ) Notice: Subject to any disclaimer, the term of this patent is extended or adjusted under 35 U.S.C. 154(b) by 150 days.

(21) Appl. No.: 14/963,203

(22) Filed: Dec. 8, 2015

(65) Prior Publication Data

US 2016/0162163 A1    Jun. 9, 2016

(30) Foreign Application Priority Data

Dec. 8, 2014    (KR) ........................ 10-2014-0174963

(51) Int. Cl.
| | |
|---|---|
| *G06F 3/048* | (2013.01) |
| *G06F 3/0484* | (2013.01) |
| *G06F 3/0488* | (2013.01) |
| *G06F 3/0482* | (2013.01) |
| *G06F 3/01* | (2006.01) |

(52) U.S. Cl.
CPC ........ *G06F 3/04845* (2013.01); *G06F 3/0482* (2013.01); *G06F 3/04842* (2013.01); *G06F 3/04847* (2013.01); *G06F 3/04883* (2013.01)

(58) Field of Classification Search
CPC ............... G06F 3/04845; G06F 3/0482; G06F 3/04842; G06F 3/04847
See application file for complete search history.

(56) References Cited

U.S. PATENT DOCUMENTS

| | | | | |
|---|---|---|---|---|
| 5,161,535 A | * | 11/1992 | Short .................... | A61B 8/00 345/173 |
| 5,291,587 A | * | 3/1994 | Kodosky ............... | G06F 3/0481 703/2 |
| 5,315,999 A | * | 5/1994 | Kinicki ................. | A61B 8/467 600/443 |

(Continued)

FOREIGN PATENT DOCUMENTS

EP    1088524 A1    4/2001

OTHER PUBLICATIONS

Adobe Systems Inc., Using dobe Photoshop Elements 9, Jan. 3, 2012. 1-2 and 124: https://help.adobe.com/archive/en_US/photoshopelements/9/photoshopelements_9_help.pdf.*

*Primary Examiner* — Nicholas Augustine
(74) *Attorney, Agent, or Firm* — McDermott Will & Emery LLP

(57) ABSTRACT

Disclosed herein is an input apparatus and a medical imaging apparatus having the same, an apparatus configured to adjust specular characteristics of 3D medical images, more particularly, an input apparatus configured to allow specular characteristics of 3D medical images to be changed easily and quickly. The input apparatus includes an input unit configured to receive a command related to operations of a medical imaging apparatus, and a touch screen configured to display a plurality of objects in which a combination of at least one variables related to specular characteristics is applied.

17 Claims, 13 Drawing Sheets

(56) References Cited

U.S. PATENT DOCUMENTS

| | | | |
|---|---|---|---|
| 5,321,420 A * | 6/1994 | Rezek | G01R 1/025 345/440.1 |
| 5,627,567 A * | 5/1997 | Davidson | G06F 3/0488 345/170 |
| 5,797,397 A * | 8/1998 | Rosenberg | A61B 8/00 600/400 |
| 6,063,030 A * | 5/2000 | Vara | G06F 19/00 600/437 |
| 6,599,244 B1 * | 7/2003 | Epps | A61B 8/00 600/437 |
| 6,991,605 B2 * | 1/2006 | Lim | A61B 8/00 128/916 |
| 2007/0014446 A1 | 1/2007 | Sumanaweera et al. | |
| 2009/0153495 A1 * | 6/2009 | Chen | G06F 3/04847 345/173 |
| 2010/0092064 A1 * | 4/2010 | Li | A61B 5/0084 382/133 |
| 2011/0301441 A1 * | 12/2011 | Bandic | A61B 5/0059 600/306 |
| 2012/0321759 A1 * | 12/2012 | Marinkovich | A61B 5/0531 426/231 |
| 2014/0164997 A1 * | 6/2014 | Lee | G06F 3/04883 715/810 |

* cited by examiner

INPUT APPARATUS AND MEDICAL IMAGE APPARATUS COMPRISING THE SAME

CROSS-REFERENCE TO RELATED APPLICATION(S)

This application claims the benefit of Korean Patent Application No. 10-2014-0174963, filed on Dec. 8, 2014 in the Korean Intellectual Property Office, the disclosure of which is incorporated herein by reference.

BACKGROUND

1. Field

Embodiments of the present disclosure relate to an input apparatus and a medical imaging apparatus including the same, more particularly an apparatus configured to apply specular characteristics to a three dimensional medical image.

2. Description of Related Art

Medical imaging apparatus are apparatuses that noninvasively acquire images of the inside of a subject by emitting X-ray or applying magnetic field to the subject. Medical imaging apparatuses include magnetic resonance imaging (MRI) apparatuses, computed tomography (CT) apparatuses, single-photon emission computed tomography (SPECT), positron emission tomography (PET), ultrasound imaging apparatuses, and tomosynthesis.

Particularly, the medical imaging apparatus may generate three dimensional (3D) volume data as well as two dimensional (2D) sectional plane images of a subject. A user may figure out morphological features of the inside of the subject by using the 3D volume data and thus the 3D volume data may be useful in diagnostic applications.

In addition, apparatuses and methods configured to provide more realistic 3D imaging information to a user have been actively developed so that a user may easily procedure an subject while watching a 3D image when simple examining or having procedure with an invasion.

SUMMARY

Therefore, it is an aspect of the present disclosure to provide an apparatus configured to adjust specular characteristics of 3D medical images, more particularly, an input apparatus configured to allow specular characteristics of 3D medical images to be changed easily and quickly.

Additional aspects of the present disclosure will be set forth in part in the description which follows and, in part, will be obvious from the description, or may be learned by practice of the disclosure.

In accordance with one aspect of the present disclosure, an input apparatus includes an input unit configured to receive a command related to operations of a medical imaging apparatus from a user, and a touch screen configured to display a plurality of objects in which a combination of at least one variables related to specular characteristics of a medical image outputted from the medical imaging apparatus is applied.

When any one of the plurality of objects is touched, the touch screen may receive at least one variable values related to specular characteristics applied to the object The variables related to specular characteristics may include specular brightness, specular sharpness, specular smoothness, and specular roughness.

The touch screen may display a medical image in which a combination of at least one predetermined variables related to specular characteristics is applied, and may display at least one variable values applied to the medical image The touch screen may display by changing variables related specular characteristics of the medical image when a command of changing a variable is inputted.

The inputting a command of changing a variable may include dragging a variable on the touch screen or selecting a variable by touching the variable.

The touch screen may display by enlarging at least one objects corresponding to the command of enlarging when a command of enlarging is inputted, and may display by reducing at least one objects corresponding to the command of reducing when a command of reducing is inputted.

The touch screen may display an object, in which specular characteristics appropriate for a medical image outputted form the medical imaging apparatus is applied, to be distinguished from the other objects.

The input unit may include buttons to adjust variables related to specular characteristics of a medical image outputted from the medical imaging apparatus.

In accordance with an aspect of the present disclosure, a medical imaging apparatus includes an input apparatus provided with an input unit configured to receive a command from a user, and a touch screen configured to display a plurality of objects in which a combination of at least one variables related to specular characteristics of a medical image of a subject is applied, and a display unit configured to display a medical image in which specular characteristics corresponding to the selected object is applied, when any of the plurality of objects displayed on the touch screen is selected.

The input apparatus may include a touch screen receiving at least one variable values related to specular characteristics applied to the object when any one of the plurality of objects is selected The input apparatus may include a touch screen displaying a medical image in which a combination of at least one predetermined variables related to the specular characteristics is applied, and displaying at least one variable values applied to the medical image.

The input apparatus may include a touch screen displaying by changing variables related specular characteristics of the medical image when a command of changing a variable is inputted.

The inputting a command of changing a variable may include dragging a variable on the touch screen or selecting a variable by touching the variable.

The input apparatus may include a touch screen a touch screen displaying by enlarging at least one objects corresponding to the command of enlarging when a command of enlarging is inputted, and may display by reducing at least one objects corresponding to the command of reducing when a command of reducing is inputted.

The input apparatus may include a touch screen displaying an object, in which specular characteristics appropriate for a medical image outputted from the medical imaging apparatus is applied, to be distinguished from the other objects.

The input apparatus may include an input unit which is a mechanical input unit including buttons to adjust variables related to specular characteristics of a medical image outputted from the medical imaging apparatus.

The medical imaging apparatus may further include a memory unit configured to store at least one variables related to specular characteristics of the medical images or a combination of the variables and data related to a screen displaying the plurality of objects.

BRIEF DESCRIPTION OF THE DRAWINGS

These and/or other aspects of the disclosure will become apparent and more readily appreciated from the following description of embodiments, taken in conjunction with the accompanying drawings of which:

FIGS. 13A and 3B are screens illustrating a 3D ultrasound image in which a combination of variables related to specular characteristics is applied.

DETAILED DESCRIPTION

Figure 1:
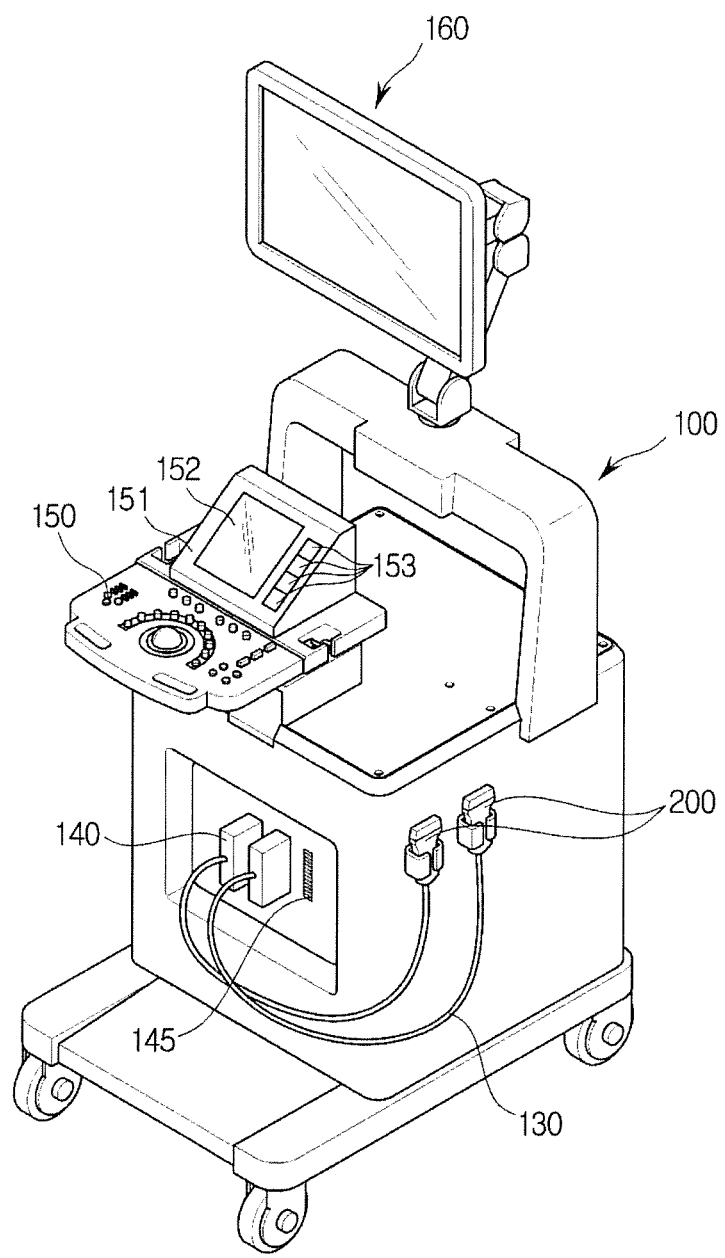
FIG. 1 is a view illustrating an exterior of an ultrasound imaging apparatus in accordance with an embodiment of the present disclosure.

The present disclosure will now be described more fully with reference to the accompanying drawings, in which exemplary embodiments of the disclosure are shown.

Embodiments disclosed in the present disclosure and configurations illustrated in drawings are merely preferable examples of the present disclosure. It should be understood that various modifications replaceable to the embodiments and the drawings of the present disclosure are available at the application time of the present application.

Hereinafter an input apparatus and a medical imaging apparatus having the same will be described in detail according to embodiments with reference to the accompanying drawings. Same reference numerals in the drawings may represent same elements, and a duplicate description of thereof will be omitted.

In embodiments of the present disclosure, the term of "subject" may represent human, animals or a part of human or animals. For example, the subject may include the liver, the cardiology, the uterus, the brain, the breasts, the abdomen, the blood vessel, or the fetus. The term of "user" may represent medical professional, such as a doctor, a nurse, a medical technologist, a medical imaging specialists, a technician to service for the medical device, but is not limited thereto.

In embodiments of the present disclosure, "medical images" may represent an imaging of a subject acquired by using X-ray diagnostic apparatuses, computed tomography (CT) scanners, magnetic resonance imaging (MRI) apparatuses, diagnostic nuclear medical apparatus as well as ultrasonic waves.

When a part "includes" or "comprises" an element, unless there is a particular description contrary thereto, the part may further include other elements, not excluding the other elements. In the following description, terms such as "unit" and "module" may indicate a unit for processing at least one function or operation, wherein the unit and the block may be realized by software, hardware, or a combination of hardware and software.

When describing specular characteristics of a medical image, for example, in medical ultrasound images, specular effects may be generated through a 3D rendering process. A specular rendering that generates specular effects may be realized by a ray tracing rendering. The ray tracing rendering is a rendering method in which a global illumination model is applied. That is, the ray tracing rendering is a method to compute a light effect caused by reflection, refraction, absorption, self-emitting, which are generated in the light and the surface, by tracing the path of the light in all pixels of the screen if a ray is shoot from a camera. The ray tracing rendering uses a local illumination model to compute a light effect caused by a reflection between a light source and an object and the local illumination model computes a light effect caused by ambient, diffuse reflection, and specular reflection. Among those, a specular effect may represent a light effect that is highlighted by the light specularly reflected from the surface. These highlights are changed in strength depending on the position of the camera.

In connection with the specular characteristics, a medical imaging technology previously used is a Feto Realistic View (FRV) to express the fetus in an ultrasound image as the same actual appearance by applying light values on a 3D medical image.

In the FRV, a three-dimensional effect is improved by adjusting the brightness value, but it may be difficult to express a bend and the like to be realistic. Further, according to a conventional technique, specular input values may be adjusted by rotating "knob" that is defined respectively in one direction by multiple times, but according to a technique described below, a plurality of variables (parameters) values of specular characteristics may be selected and adjusted by an input by one time touching. Therefore, it is possible to save an input time compared to using the knob. That is, according to the conventional technique, it is possible to determine desired variable values by turning a respective knob by a plurality of times, but according to the technique described below, it is possible to replace the plurality of operations with one time touch input. In addition, variable values related to specular characteristics may be set by a user and thus in the conventional technique, a user manipulates a knob to learn meaning of the variable values while watching a 3D medical image displayed on a display unit. Thus the user may need an initial leaning time to acquire a 3D medical image, in which desired specular characteristics are applied, by adjusting variable values of specular characteristics. However, according to the technique described below, such inconvenience may be eliminated by intuitively selecting variables by displaying guide images for medical images to be applied specular characteristics.

Hereinafter an input apparatus and a medical imaging apparatus having the same in accordance with the present disclosure will be described. For the convenience of the description, an ultrasound imaging apparatus will be described as an example of the medical imaging apparatus, but is not limited thereto.

FIG. 1 is a view illustrating an exterior of an ultrasound imaging apparatus in accordance with an embodiment of the present disclosure.

As illustrated in FIG. 1, an ultrasound imaging apparatus may include a main body 100, a display unit 160 connected to the main body 100, a manipulation panel 150, an input apparatus 151, and an ultrasound probe 200.

On a lower portion of the main body 100, a plurality of caster (not shown) may be provided for the mobility of an ultrasonic apparatus. By using the plurality of caster, a user may fix the ultrasound imaging apparatus to a certain location, or may move the ultrasound imaging apparatus toward a certain direction. The ultrasound imaging apparatus may be a cart-type ultrasound imaging apparatus.

Unlike an ultrasound imaging apparatus illustrated in FIG. 1, the ultrasound imaging apparatus may be a portable ultrasonic apparatus configured to be hand-held when moving at a long distance. In this case, the portable ultrasound apparatus may not be provided with the caster. The portable ultrasound apparatus may be in a type of PACS viewer, smart phone, lap top computer, personal digital assistant (FDA), tablet personal computer, but is not limited thereto.

The ultrasound probe 200 may be a portion to make a contract with a surface of a subject, and may send/receive ultrasonic waves to/from the subject. Particularly, the ultrasound probe 200 may generate ultrasonic waves according to input pulses, may send the ultrasonic waves to the inside of the subject and may receive echo ultrasonic waves reflected from a target part of the inside of the subject.

The main body 100 may transmit ultrasonic signals to the ultrasound probe 200 and may receive echo ultrasonic signals from the ultrasound probe 200, and may generate an ultrasound image based on the echo ultrasonic signals.

The generated ultrasound images may be provided to a user through the display unit 160. The user may diagnose an object that is a patient by visually examining an ultrasound image of the inside of the subject, which is provided from the display unit 160.

The display unit 160 may display various user interface (UI) related to the control of the ultrasound imaging apparatus. The user may check UI provided through the display unit 160 and may input control commands related to the ultrasound imaging apparatus or a part of the ultrasound imaging apparatus through the manipulation panel 150.

In addition, the display unit 160 may display ultrasound images acquired during an ultrasound diagnosis. The display unit 160 may be realized by one of devices disclosed in embodiments, such as Cathode Ray Tube (CRT), and Liquid Crystal Display (LCD). The display unit 160 may provide 3D images as well as 2D images.

The manipulation panel 150 may receive commands related to operations of the ultrasound imaging apparatus. The user may input a command to start ultrasonic examination, select a target part, select a diagnostic position, select a mode for an output ultrasonic image, etc., through the manipulation panel 150. In accordance with an embodiment, the manipulation panel 150 may be provided on an upper portion of the main body 100, as illustrated in FIG. 1. The manipulation panel 150 may include at least one of a switch, a key, a wheel, a joy stick, a trackball, and a knob.

The manipulation panel 150 may further include an input apparatus 151 provided with a touch screen 152. The input apparatus 151 may include the touch screen 152 and a mechanical input unit 153. A user may input data related to specular characteristics of 3D ultrasound images outputted from the ultrasound imaging apparatus through the touch screen 152 and the mechanical input unit 153. At this time, the touch screen 152 may be realized by a touch panel and a user may input a control command by touching the touch screen 152. In addition, a user may input a plurality of variable values, which are related to specular characteristics, at a time by touching any of a plurality of objects in which a combination of at least one variables related to specular characteristics of a 3D ultrasound image displayed on the touch screen 152 may be applied. At this time, the object may represent an exemplary screen displaying specular characteristics by applying a combination of variable values related to specular characteristics. The object may allow a user to intuitively input variable values related to specular feature of 3D ultrasound images through the touch screen 152 and the mechanical input unit 153.

The touch screen 152 may display information related to the manipulation of the ultrasound imaging apparatus. For example, the touch screen 152 may display menus and guidance needed for setting the ultrasonic imaging apparatus and may display a current set of the ultrasonic imaging apparatus. In addition, the touch screen 152 may display a plurality of objects in which a combination of at least one variables related to specular characteristics of a 3D ultrasound image outputted from the ultrasound imaging apparatus may be applied.

The touch screen 152 may employ a Liquid Crystal Display (LCD), a Light Emitting Diodes (LED), an Organic Light Emitting Diodes (OLED), etc.

The ultrasound probe 200 may be connected to one end of a cable 130, and the other end of the cable 130 may be connected to a male connector 140. The male connector 140 connected to the other end of the cable 130 may be physically coupled to a female connector 145 of the main body 100.

According to the above-described method, the single ultrasound probe 200 may be connected to the single main body 100, or a plurality of ultrasound probes 200 may be connected to the single main body 100 in a similar manner. For this purpose, a plurality of female connectors may be installed in the main body 100. FIG. 1 illustrates a case when two ultrasound probes 200 may be connected to the single main body 100.

Unlike FIG. 1, the ultrasound probe 200 may be connected to the main body 100 through a wireless communication. In this case, the ultrasound probe 200 may perform wireless transmission of echo ultrasound signals corresponding to echo ultrasound received from an object ob to the main body 100.

The ultrasound probe 200 may transmit or receive ultrasonic waves to or from a subject ob by making contact with a surface of the subject. Particularly, the ultrasound probe 200 may emit ultrasonic waves to the inside of the subject according to ultrasound signals which is electrical signals provided from the main body 100. The ultrasound probe 200 may collect echo ultrasonic waves reflected from a certain part inside the subject ob and may transmit echo ultrasound signals corresponding to the echo ultrasonic waves to the main body 100

For this purpose, the ultrasound probe 200 may include a transducer and a MUltipleXer (MUX) circuit. The transducer may include a plurality of elements configured to convert electrical signals into ultrasonic waves or convert ultrasonic waves into electrical signals by vibrating. The plurality of elements may be arranged on a surface of the ultrasound probe housing. Particularly, a plurality of transducers may be arranged in parallel to an opening unit so that transmission or reception of ultrasonic waves may be performed through the opening unit provided on a surface of the housing.

Figure 2:
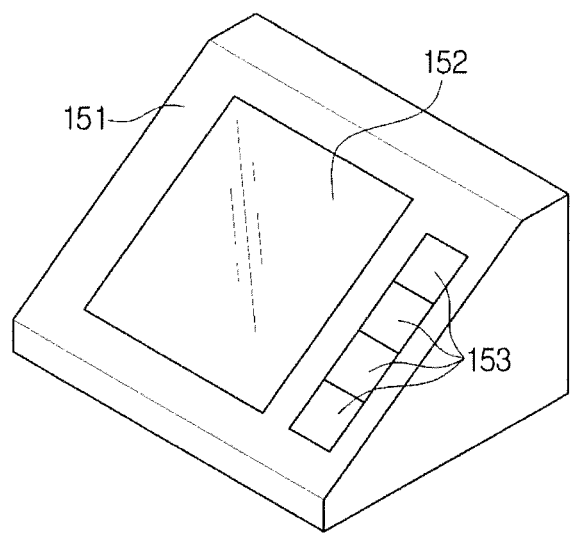
FIG. 2 is a view illustrating an exterior of an input apparatus in accordance with an embodiment of the present disclosure.

FIG. 2 is a view illustrating an exterior of an input apparatus in accordance with an embodiment of the present disclosure.

As mentioned in FIG. 1, the input apparatus 151 may include the touch screen 152 and the input unit 153. The input unit 153 may correspond to a mechanical input unit, and may be a button input unit in a press manner or a rotation input unit, but is not limited thereto.

A user may input data related to specular characteristics of 3D ultrasound images outputted from the ultrasound imaging apparatus through the touch screen 152 and the mechanical input unit 153. A user may input a control command by touching the touch screen 152.

The touch screen 152 may display information related to the manipulation of the ultrasound imaging apparatus, and a plurality of objects in which a combination of at least one variables related to specular characteristics of a 3D ultrasound image outputted from the ultrasound imaging apparatus may be applied.

At this time, the user may input a plurality of variable values related to specular characteristics, at a time by touching any of a plurality of objects in which a combination of at least one variables related to specular characteristics of a 3D ultrasound image displayed on the touch screen 152 may be applied.

A screen displayed on the touch screen 152 of the input apparatus 151 and a case when a user inputs variables relate to specular characteristics by using the touch screen 152 according to an embodiment of the present disclosure will be described in detail with reference to FIGS. 3 to 12.

Figure 3:
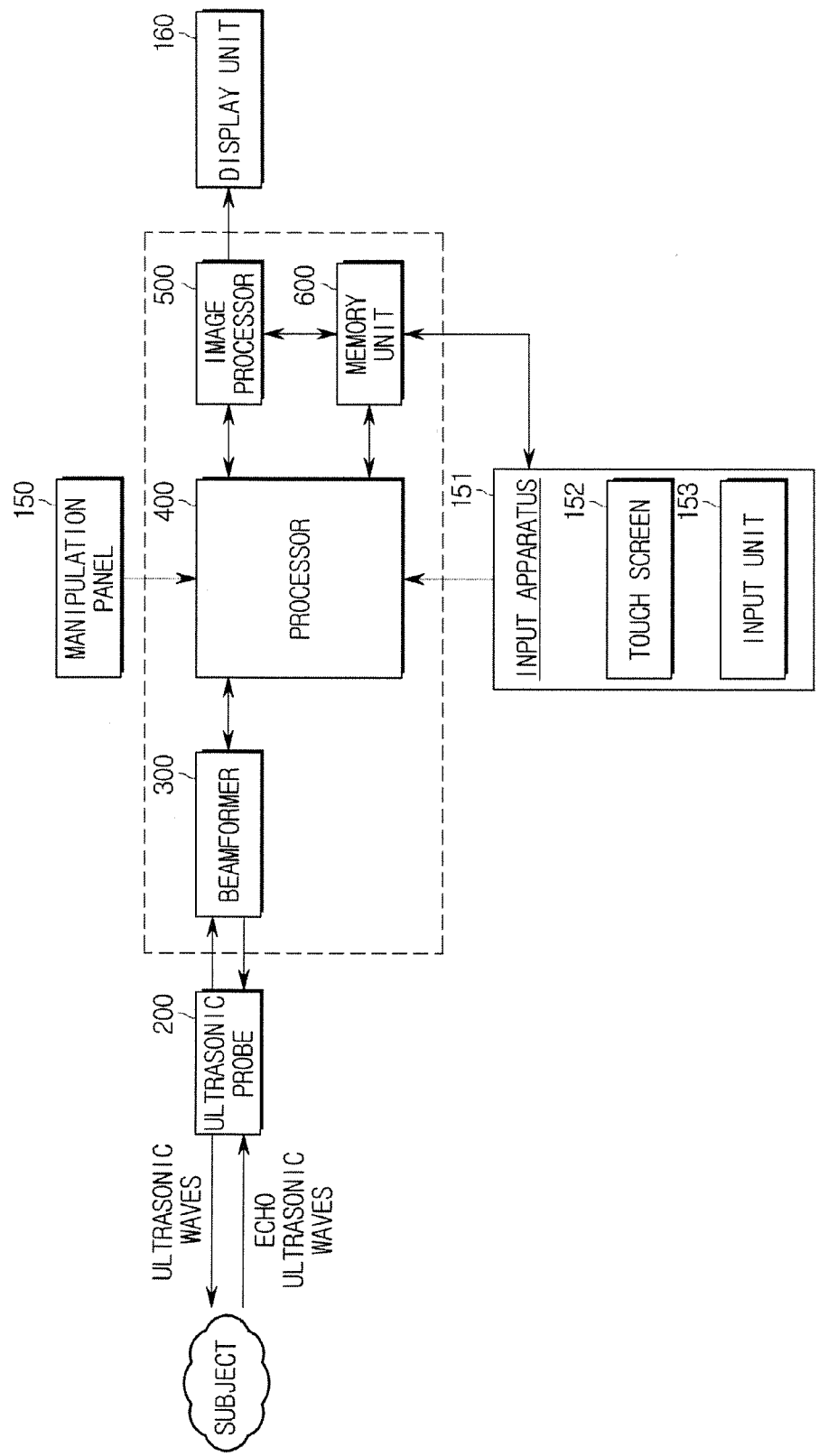
FIG. 3 is a control block diagram illustrating an ultrasound imaging apparatus in accordance with an embodiment of the present disclosure.

FIG. 3 is a control block diagram illustrating an ultrasound imaging apparatus in accordance with an embodiment of the present disclosure.

Referring to FIG. 3, an ultrasound imaging apparatus in accordance with an embodiment of the present disclosure may include an ultrasound probe 200, a beamformer 300, a processor 400, an image processor 500, and a memory unit 600.

The ultrasound probe 200 may be realized in various manner configured to acquire volume data of an object. The ultrasound probe 200 may be a part to make connection with a surface on an object and may transmit or receive ultrasonic waves to or from the object. Particularly, the ultrasound probe 200 may generate ultrasonic waves according to input pulses and may transmit the ultrasonic waves to the inside of the object. And then the ultrasound probe 200 may receive echo ultrasonic waves reflected from a certain part inside the object.

The beamformer 300 may perform beamforming so that ultrasonic waves transmitted or received to or from the ultrasound probe 200 may be focused. The beamformer 300 may include a transmit beamformer (not shown) and a receive beamformer (not shown), and may convert analog signals into digital signals or vice versa. The beamformer 300 may adjust a time difference of ultrasound waves which are transmitted or received to or from at least one transducer. As illustrated in FIG. 1, the beamformer 300 may be included in the main body 100 of the ultrasound imaging apparatus, but alternatively the beamformer 300 may be provided in the ultrasound probe 200 to perform function thereof. The beamformer 300 may employ any of the known beamforming method, a beamforming method by combining a plurality of methods or selectively employ a beamforming method.

The processor 400 may receive beamforming data from the beamformer 300, and may transmit data to allow the image processor 500 to perform image processing. In addition, the processor 400 may allow data inputted from the manipulation panel 150 or the input apparatus 151 to be stored in the memory unit 600. When a user inputs variable values related to specular characteristics by using the touch screen 152 of the input apparatus 151 according to an embodiment of the present disclosure, the processor 400 may control so that ultrasound images in which specular characteristics thereof, such as sharpness, brightness, and etc, are adjusted by applying the variable values, may be displayed on the display unit 160.

The image processor 500 may generate ultrasound images by processing beamformed echo ultrasound signals. The image processor 500 may process echo ultrasound signals according to any of the known imaging processing method. For example, the image processor 500 may perform Time Gain Compensation (TGC) on beamformed echo ultrasound signals. And then the image processor 500 may set Dynamic Range (DR). After setting Dynamic Range (DR), the image processor 500 may compress echo ultrasound signals in the set dynamic range. At last, after rectifying echo ultrasound signals, the image processor 500 may remove noisy. By using the processed echo ultrasound signals, the image processor 500 may generate ultrasound images. The image processor 500 may generate various ultrasound images. Particularly, the image processor 500 may include Amplitude Mode (A-Mode) images, Brightness Mode (B-Mode) images, Motion Mode (M-mode) images, Doppler Mode images.

In accordance with an embodiment of the present disclosure, the image processor 500 may generate a realistic ultrasound image having improved 3D effects and high definition by applying various specular characteristics. That is, when a command related to specular characteristics is input from the outside through the manipulation panel 150 or the input apparatus 151 based on specular characteristics of an ultrasound image stored in the memory unit 600, the input specular characteristics may be applied to a 3D ultrasound image. At this time, the image processor 500 may include one or more processor. A processor may be implemented by an array of multiple logic gates, a combination with general-purpose microprocessors and memory in which programs capable of being implemented in the microprocessors is stored. For example, the image processor 500 may be realized by general-purpose graphic processing unit (GPU).

The memory unit 600 may store variable values related to specular characteristics of a 3D ultrasound image according to an embodiment of the present disclosure. The memory unit 600 may store a combination of at least one variable values related to specular characteristics, and may store data about a plurality of objects displayed by applying the combination of variable values. In addition, the memory unit 600 may store a combination of predetermined variables according to the type of ultrasound image so that a user may easily select variable values related to specular characteristics of an ultrasound image. The memory unit 600 may store ultrasound images, in which the combination of variables is applied, as reference images. Further, the memory unit 600 may store object values in which proper specular characteristics are applied, according to an ultrasound image outputted from an ultrasound imaging apparatus.

The memory unit 600 may include high-speed random access memory, magnetic disk, SRAM, DRAM, ROM, etc, but is not limited thereto. In addition, the memory unit 600 may be detachably installed on the ultrasound imaging apparatus. For example, the memory unit 600 may include Compact Flash Card, Secure Digital Card, Smart Media Card, Multimedia Card (MMC), or Memory Stick, but is not limited thereto. The memory unit 600 may be provided on the outside of the ultrasound imaging apparatus, and may transmit or receive data to or from the ultrasound imaging apparatus through wired or wireless communication.

As illustrated in FIG. 1, a control command for an ultrasound imaging apparatus and a configuration of the ultrasound imaging apparatus may be input through the manipulation panel 150, and a duplicate description will be omitted.

The input apparatus 151 may include the touch screen 152 and the mechanical input unit 153. A user may input data related to specular characteristics of 3D ultrasound images outputted from the ultrasound imaging apparatus based on data stored in the memory unit 600 through the touch screen 152 and the mechanical input unit 153. At this time, the touch screen 152 may be realized by a touch panel and a user may input a plurality of variable values, which are related to specular characteristics, at a time by touching any of a plurality of objects in which a combination of at least one variables related to specular characteristics of a 3D ultrasound image displayed on the touch screen 152 may be applied. Therefore, by inputting the plurality of variable values related to specular characteristics by one time touching, an input time may be reduced and variable values may be intuitively applied. A description of the input apparatus 151 as those shown in FIG. 1 will be omitted.

The display unit 160 may display various user interface (UI) related to the control of the ultrasound imaging apparatus and may display ultrasound images acquired during an ultrasound diagnosis. In addition, the display unit 160 may provide 3D images as well as 2D images and may display ultrasound images in which a specular characteristic corresponding to a selected object is applied when a user selects any one of objects displayed on the touch screen 152 of the input apparatus 151.

Figure 4A:
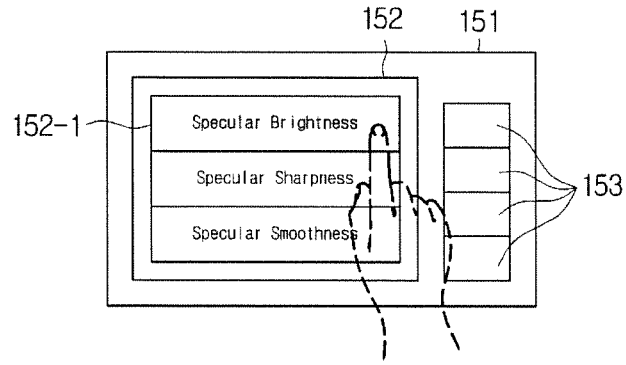
FIGS. 4A-4C are screens displayed on a touch screen of an input apparatus to select variables related to specular characteristics.
Figure 4B:
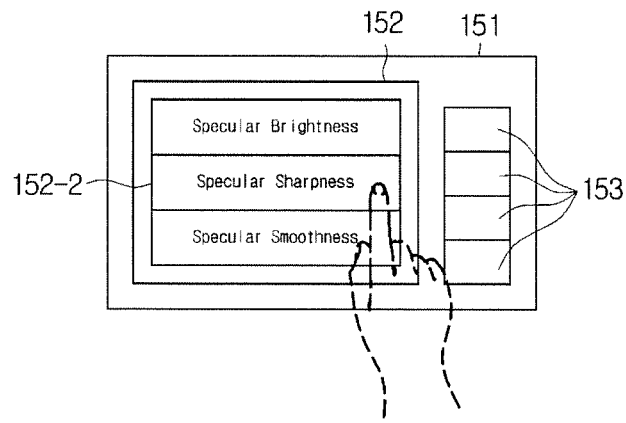
Figure 4C:
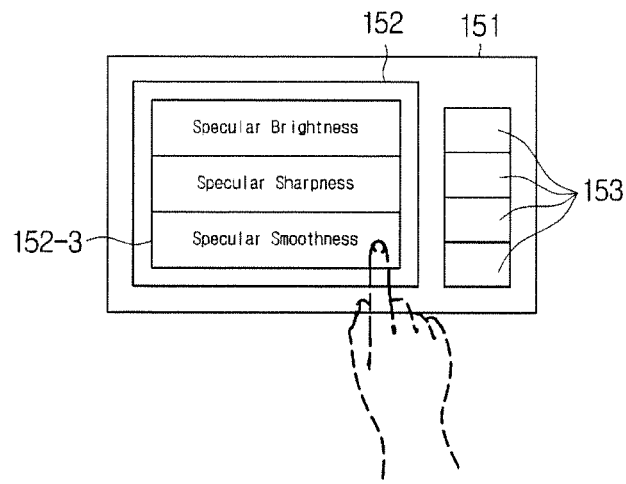

FIGS. 4A-4C are screens displayed on a touch screen of an input apparatus to select variables related to specular characteristics.

As illustrated in FIGS. 4A-4C, a screen may be displayed on the touch screen 152 of the input apparatus 151 to select variables related to specular characteristics intended to be applied to a 3D ultrasound image. According to an embodiment of the present disclosure, specular characteristics may be represented as Specular Brightness, Specular Sharpness, and Specular Smoothness, but is not limited thereto. Specular Roughness may be included in the specular characteristics. In addition, there is no limitation on a display mode of the screen to select variables related to specular characteristics. As illustrated in FIG. 4A, a user may select specular characteristic variables related to brightness by touching a specular brightness 152-1 displayed on the touch screen 152. In addition, as illustrated in FIG. 4B, a user may select specular characteristic variables related to sharpness by touching a specular brightness 152-2, and as illustrated in FIG. 4C, a user may select specular characteristic variables related to smoothness by touching a specular brightness 152-3. A user may select a single variable or two variables related to specular characteristics. That is, a single variable may be selected to change specular characteristics of 3D ultrasound images by adjusting a single variable and two variables may be selected to change or to select specular characteristics of 3D ultrasound images by adjusting two variables. A method to select variables by touching the touch screen 152 is not limited thereto and may be realized in various manners.

In addition, a user may select variables related to specular characteristics by manipulating the mechanical input unit 153 formed in a button type as well as by directly touching the touch screen 152. The type of the mechanical input unit 153 is not limited.

In a screen illustrated in FIGS. 4A-4C, the selected variables related to specular characteristics may be used as variables to adjust specular characteristics of a 3D ultrasound image. In addition, the selected variables may be used as coordinate axes variables of a plurality of objects, in which a combination of at least one variables related to specular characteristics is applied, displayed on the touch screen 152.

Figure 5:
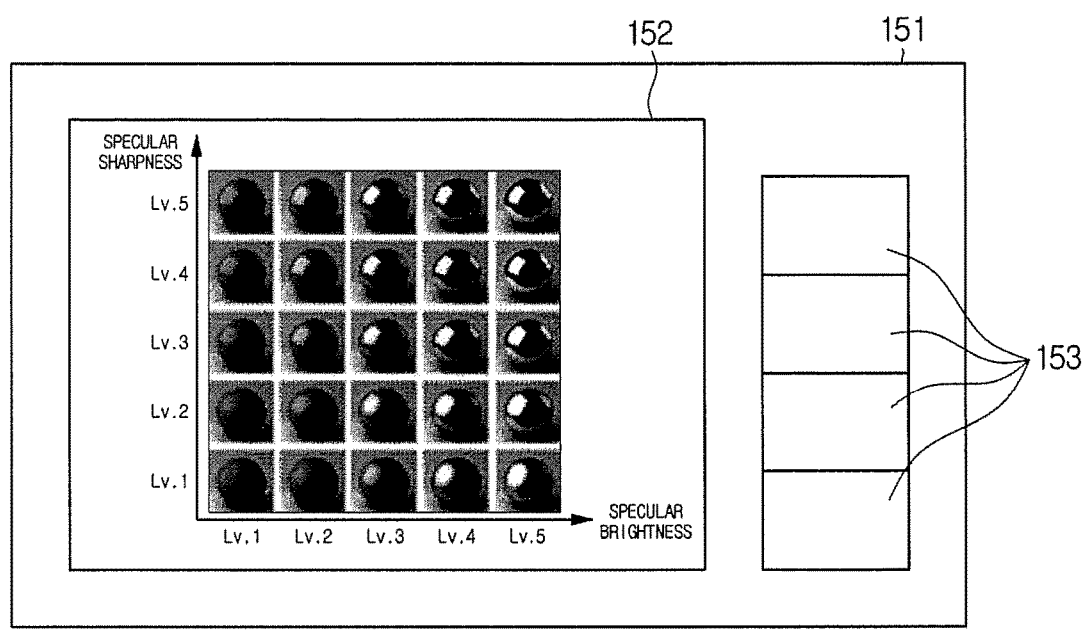
FIG. 5 is a screen illustrating a touch screen displaying a plurality of objects in which a combination of at least one variables related to specular characteristics of an ultrasound images is applied, in accordance with an embodiment of the present disclosure.

FIG. 5 is a screen illustrating a touch screen displaying a plurality of objects in which a combination of at least one variables related to specular characteristics of an ultrasound images is applied, in accordance with an embodiment of the present disclosure.

As illustrated in FIG. 5, a plurality of objects, in which a combination of variables related to specular characteristics intended to be applied to an ultrasound image is applied, will be displayed on the touch screen 152 of the input apparatus 151. In FIG. 5, a plurality of screens in a shape of a sphere may illustrate a state in which specular characteristics of an image are changed according to variables related to specular characteristics of X- and Y-axes, and the respective sphere-shaped screen may be defined as an object. A shape of the plurality of objects is not limited thereto, and the shape of the plurality of object may be set and displayed in various manners. Data about a shape of object and set values, in which specular characteristics are applied, may be stored in the memory unit 600 and may be displayed on the touch screen 152 of the input apparatus 151 according to a control of the processor 400. In FIG. 5, according to an embodiment of the present disclosure, a variable of X-axis may represent specular brightness and a variable of Y-axis may represent specular sharpness, but is not limited thereto. Therefore, specular smoothness may be set as a variable in X-axis or Y-axis, as illustrated in FIG. 4. Specular brightness variable of X-axis may be displayed to be set as a brightness level from Lv.1 to Lv. 5 and specular sharpness of Y-axis may be displayed to be set as a sharpness level from Lv.1 to Lv. 5, but a range of a level of variable values is not limited thereto and there is no limitation on a method to display a level.

As illustrated in FIG. 5, an object may be displayed to be brighter as a level value of specular brightness in X-axis increases to the right side, and an object may be displayed to be clearer as a level value of specular sharpness in Y-axis increases to the up side. A specular brightness level and a specular sharpness level may be adjusted to adjust specular characteristics of a 3D ultrasound image. At this time, when the specular brightness level and the specular sharpness level are set as a certain level, it may be difficult for a user to intuitively recognize an amount of brightness and sharpness of an ultrasound image. Therefore, as illustrated in FIG. 5, by displaying a plurality of objects, a user may estimate specular brightness and specular sharpness of a 3D ultrasound image, in which actual specular characteristics are applied, according to adjusting a level of a specular characteristics variable. That is, the object displayed on the touch screen 152 may correspond to a guide screen to apply specular characteristics on a 3D ultrasound image. But, according to the conventional technique, the guide screen related to specular characteristics may be not displayed on the input apparatus 151 which is disclosed in the present disclosure. Thus a user may adjust a level of variable values related to specular characteristics after learning the level of the variable values, and it may be difficult for a user to intuitively select and apply specular characteristics. According an embodiment of the present disclosure, a user may easily and quickly adjust specular characteristics since a user may easily estimate a relation between a combination of variables related to specular characteristics and a 3D ultrasound image in which the combination of variables are applied.

Figure 6:
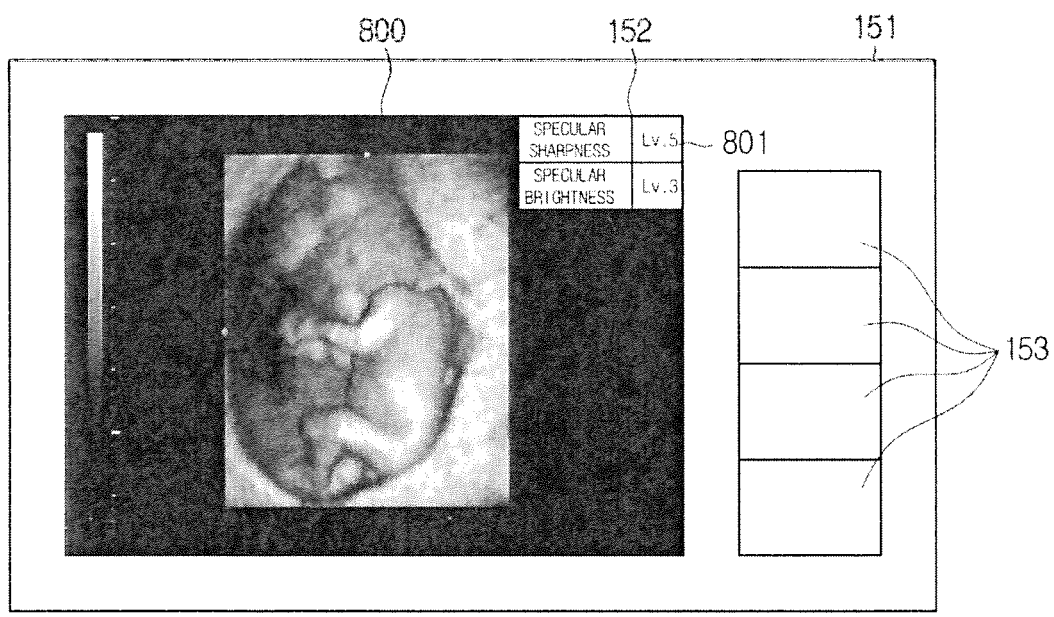
FIG. 6 is a screen illustrating a touch screen displaying an image in which a combination of at least one predetermined variables related to specular characteristics is applied according to the type of an ultrasound images in accordance with an embodiment of the present disclosure, and variable values.

FIG. 6 is a screen illustrating a touch screen displaying an image in which a combination of at least one predetermined variables related to specular characteristics is applied according to the type of an ultrasound images in accordance with an embodiment of the present disclosure, and variable values.

As illustrated in FIG. 6, a screen in which the most proper variable value of specular characteristics is applied according to the type of an ultrasound image, and the applied variable value may be displayed on the touch screen 152 of the input apparatus 151, and this may correspond to a kind of a reference image. This screen may be configured to allow a user to easily determine and select a level value according to the type of variable values related to specular characteristics intended to be applied to an ultrasound image. According to the type of a subject, an ultrasound image may include an ultrasound image of the fetus, and an ultrasound image of organs, such as the liver, the cardiology, the uterus, the brain, the breasts, and the abdomen. Since variable values applied to specular characteristics or a degree of application may be various according to the type of ultrasound image based on a subject, a user may select and apply different variables related to specular characteristics according to the type of ultrasound image. It may be difficult to select the most proper specular characteristics variable according to the type of ultrasound image. Therefore, ultrasound image data, in which a combination of at least one predetermined variables related to specular characteristics is applied, may be stored in the memory unit 600 by the type of the ultrasound image. Variable data applied to corresponding ultrasound images may be stored. The ultrasound image data in which a combination of variables related to specular characteristics is applied may represent an ultrasound image generated by the image processor 500 by adjusting previous specular characteristics.

As illustrated in FIG. 6, as for an ultrasound image of the fetus displayed on the touch screen 152, an ultrasound image 800, in which a combination of predetermined the most proper specular characteristics variables is applied, may be displayed. In addition, variable values of specular characteristics 801 applied to the ultrasound image of the fetus 800 may be displayed, and a shape and a location thereof are not limited thereto. According to an embodiment of the present disclosure. FIG. 6 illustrates that the ultrasound image of the fetus 800 may be displayed to be the most actual appearance of the fetus when specular sharpness is Lv. 5 and specular brightness is Lv. 3. A level value of specular characteristics variable may be displayed in various ways according to the type of ultrasound image, and the type of variables may be displayed in various ways. Therefore, various embodiments may be present.

FIGS. 7A-7D are screens illustrating a touch screen displaying objects to adjust a single variable value related to specular characteristics in accordance with an embodiment of the present disclosure.

According to an embodiment of the present disclosure, in order to adjust specular characteristics of a 3D ultrasound image, changing variables related to specular characteristics may include adjusting a single variable. As illustrated in FIGS. 7A-7D, a screen displaying objects in a one dimension may be displayed on the touch screen 152 to adjust a single variable related to the specular characteristics. FIG. 7A is a screen displaying that a specular brightness value among variables of the specular characteristics becomes variables of X-axis and the specular brightness value is adjusted with respect to the X-axis. That is, when the other variables related to the specular characteristics are fixed without adjusting, the specular brightness of a 3D ultrasound image may be adjusted. At this time, the specular brightness variables displayed in the X-axis may be displayed as other variables. According to an embodiment of the present disclosure, the specular brightness may be displayed from Lv. 1 to Lv. 5, as illustrated in FIG. 7A. As illustrated in FIG. 7A, a brightness of the 3D ultrasound image may be adjusted to be brighter as from Lv. 1 to Lv. 5. A user may adjust a variable value by touching a screen of the touch screen 152, wherein the screen displays objects in one dimension. As illustrated in FIG. 7A, a variable value may be selected by dragging an axis displaying variable values or by directly selecting an object in which the variable value is applied. In a case of dragging, the specular brightness value may be adjusted to be brighter or darker by dragging by touching from the left side to the right side or from the right side to the left side on an axis displaying from Lv. 1 to Lv. 5. In a case of directly selecting an object, the specular brightness value may be selected to be Lv. 4 by directly touching a screen displaying an object of Lv. 4 by a hand. When selecting the specular brightness variables, a 3D ultrasound image may be changed into a selected specular brightness level value.

FIG. 7B is a screen showing that a specular sharpness value among variables of the specular characteristics becomes variables of X-axis and the specular sharpness value is adjusted with respect to the X-axis. That is, when the other variables related to the specular characteristics are fixed without adjusting, the specular sharpness of a 3D ultrasound image may be adjusted. At this time, the specular sharpness variables displayed in the X-axis may be displayed as other variables. According to an embodiment of the present disclosure, the specular sharpness is displayed from Lv. 1 to Lv. 5, as illustrated in FIG. 7B. As illustrated in FIG. 7B, a sharpness of the 3D ultrasound image may be adjusted to be shaper as from Lv. 1 to Lv. 5. As illustrated in FIG. 7A, a user may drag or select an object by touching the touch screen 152, and in a case of selecting the specular sharpness variables, a 3D ultrasound image may be changed into a selected specular sharpness level value.

Figure 7:
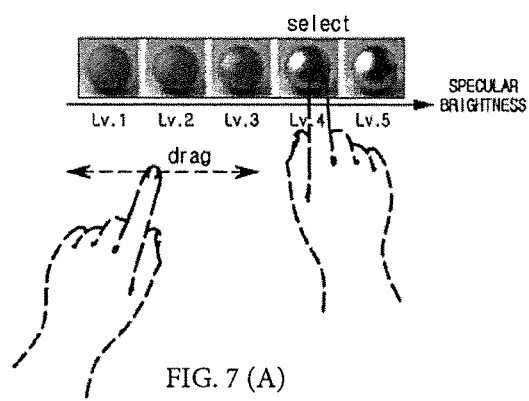
FIGS. 7A-7D are screens illustrating a touch screen displaying objects to adjust a single variable value related to specular characteristics in accordance with an embodiment of the present disclosure.
Figure 7:
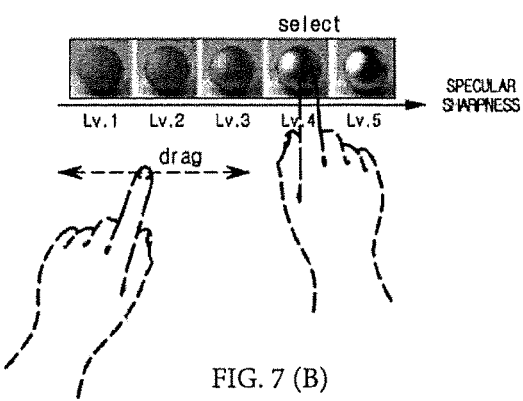
Figure 7C:
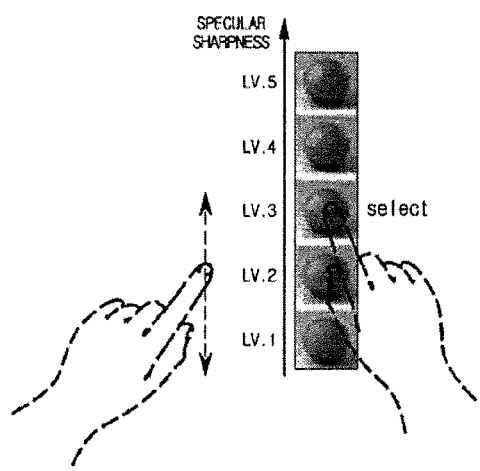

FIG. 7C is a screen showing that a specular sharpness value among variables of the specular characteristics becomes variables of Y-axis and the specular sharpness value is adjusted with respect to the Y-axis. That is, when the other variables related to the specular characteristics are fixed without adjusting, the specular sharpness of a 3D ultrasound image may be adjusted. At this time, the specular sharpness variables displayed in the Y-axis may be displayed as other variables. According to an embodiment of the present disclosure, the specular sharpness is displayed from Lv. 1 to Lv. 5, as illustrated in FIG. 7C. As illustrated in FIG. 7C, a sharpness of the 3D ultrasound image may be adjusted to be shaper as from Lv. 1 to Lv. 5. A user may adjust a variable value by touching a screen of the touch screen 152, wherein the screen displays objects in one dimension. As illustrated in FIG. 7C, a variable value may be selected by dragging an axis displaying variable values or by directly selecting an object in which the variable value is applied. In a case of dragging, the specular brightness value may be adjusted to be shaper or less shape by dragging by touching from the down side to the up side or from the up side to the down side on an axis displaying from Lv. 1 to Lv. 5. As illustrated in FIG. 7C, in a case of directly selecting an object, the specular sharpness value may be selected to be Lv. 3 by directly touching a screen displaying an object of Lv. 3 by a hand. When selecting the specular sharpness variables, a 3D ultrasound image may be changed into a selected specular sharpness level value.

Figure 7D:
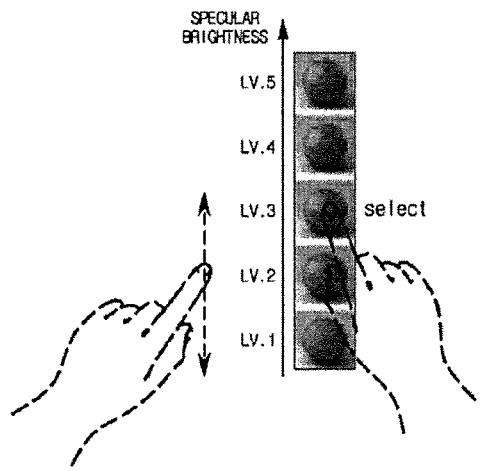

FIG. 7D is a screen showing that a specular brightness value among variables of the specular characteristics becomes variables of Y-axis and the specular brightness value is adjusted with respect to the Y-axis. That is, when the other variables related to the specular characteristics are fixed without adjusting, the specular brightness of a 3D ultrasound image may be adjusted. At this time, the specular brightness variables displayed in the Y-axis may be displayed as other variables. According to an embodiment of the present disclosure, the specular brightness is displayed from Lv. 1 to Lv. 5, as illustrated in FIG. 7D. As illustrated in FIG. 7D, a brightness of the 3D ultrasound image may be adjusted to be brighter as from Lv. 1 to Lv. 5. As illustrated in FIG. 7D, a user may drag or select an object by touching the touch screen 152, and in a case of selecting the specular brightness variables, a 3D ultrasound image may be changed into a selected specular brightness level value.

FIGS. 8A and 8B are screens illustrating a touch screen displaying objects to select a combination of two variable values related to specular characteristics in accordance with an embodiment of the present disclosure.

Figure 8:
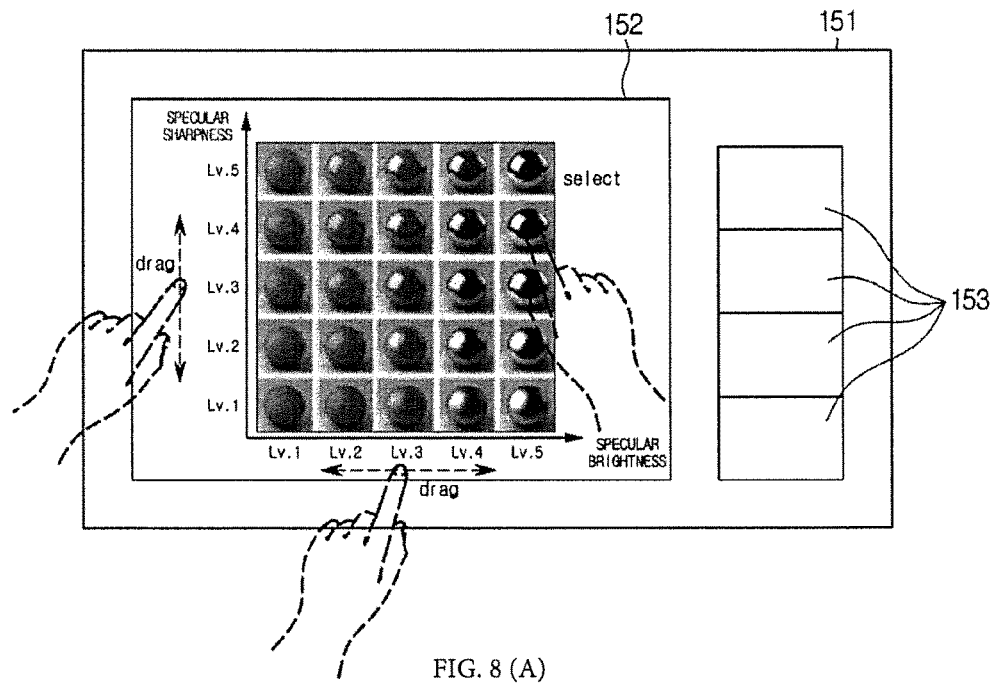
FIGS. 8A and 8B is a screen illustrating a touch screen displaying objects to select a combination of two variable values related to specular characteristics in accordance with an embodiment of the present disclosure.
Figure 8:
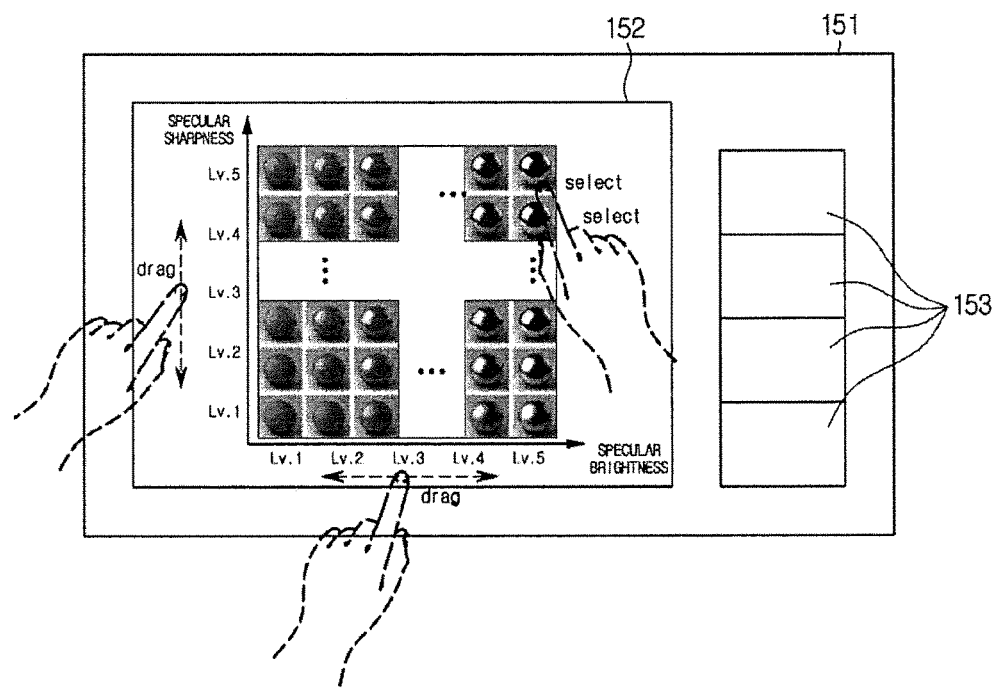

According to an embodiment of the present disclosure, in order to adjust specular characteristics of a 3D ultrasound image, changing variables related to specular characteristics may include selecting a combination of two variables. As illustrated in FIG. 8, a screen displaying a plurality of objects in two dimensions may be displayed on the touch screen 152 of the input apparatus 151 to select a combination of two variables related to the specular characteristics FIG. 8A is a screen showing that a combination of variables is selected when a specular brightness value and a specular sharpness value among variables of the specular characteristics set as variables of X-, Y-axes. That is, unlike adjusting a single variable as illustrated in FIGS. 7A-7D, two variables may be adjusted by selecting a combination of two variables. According to an embodiment of the present disclosure, as illustrated in FIG. 8A, variables of X-axis may set to specular brightness and variables of Y-axis may set to specular sharpness, but variables of X- and Y-axes may set to other specular characteristics. As illustrated in FIG. 8A, the specular brightness value and the specular sharpness value may be displayed from Lv. 1 to Lv. 5. As illustrated in a screen of an object in FIG. 8A, a 3D ultrasound image may be adjusted to be sharper and brighter as from Lv. 1 to Lv. 5.

A user may adjust and select variable values by touching a screen displaying a plurality of objects on the touch screen 152. As illustrated in FIG. 8A, a value of combination of variable may be selected by dragging X- and Y-axes displaying variable values or by directly selecting an object in which a combination of variables of X- and Y-axes is applied. In a case of dragging, the specular brightness value and the specular sharpness may be adjusted by dragging from the left side to the right side or from the right side to the left side on the X-axis displaying from Lv. 1 to Lv. 5, and by dragging from the down side to the up side or from the up side to the down side on the Y-axis. A description of the method of the adjustment by dragging will be omitted since the description is the same as those shown in FIG. 7.

As illustrated in FIG. 8A, in a case of directly selecting an object in which a combination of variables of X- and Y-axes is applied, a combination of variables in which the specular brightness value is Lv. 5 and the specular sharpness value is Lv. 4, may be selected by directly touching a screen displaying an object in which the specular brightness value is Lv. 5 and the specular sharpness value is Lv. 4. In a case of selecting a combination of variables related to two of specular characteristics, a 3D ultrasound image may be changed into a selected specular brightness level value and a selected specular sharpness level value. As mentioned above, according to an embodiment of the present disclosure, a user may select an object while watching a screen displaying an object in which a combination of two variables related to specular characteristics of a 3D ultrasound image is applied so that the specular characteristics of an ultrasound image may be adjusted. In comparison with adjusting variables related to specular characteristics by using a knob, two variable values related to specular characteristics may be selected and inputted by one time touching so that an input time may be reduced and a user may intuitively and easily adjust specular characteristics of an ultrasound image.

As mentioned above, a combination of variable may be directly selected by selecting variable values related to specular characteristics by using mechanical input unit 153 as well as by using the touch screen 152.

FIG. 8B is a screen displaying that variable values related to specular characteristics may be set in various levels. The specular brightness and the specular sharpness may set to five levels in FIG. 8A, but may set to the number of N levels in FIG. 8B. That is, the specular brightness variables of X-axis and the specular sharpness variables of Y-axis may be represented by Lv.1 to Lv. N. The variable related to the specular characteristics may be set at various levels according to the degree, and accordingly the value of the combination of variables may be represented by various levels. When the level of the variables is more subdivided, a fine difference in the value of specular characteristics may be adjusted.

Figure 9:
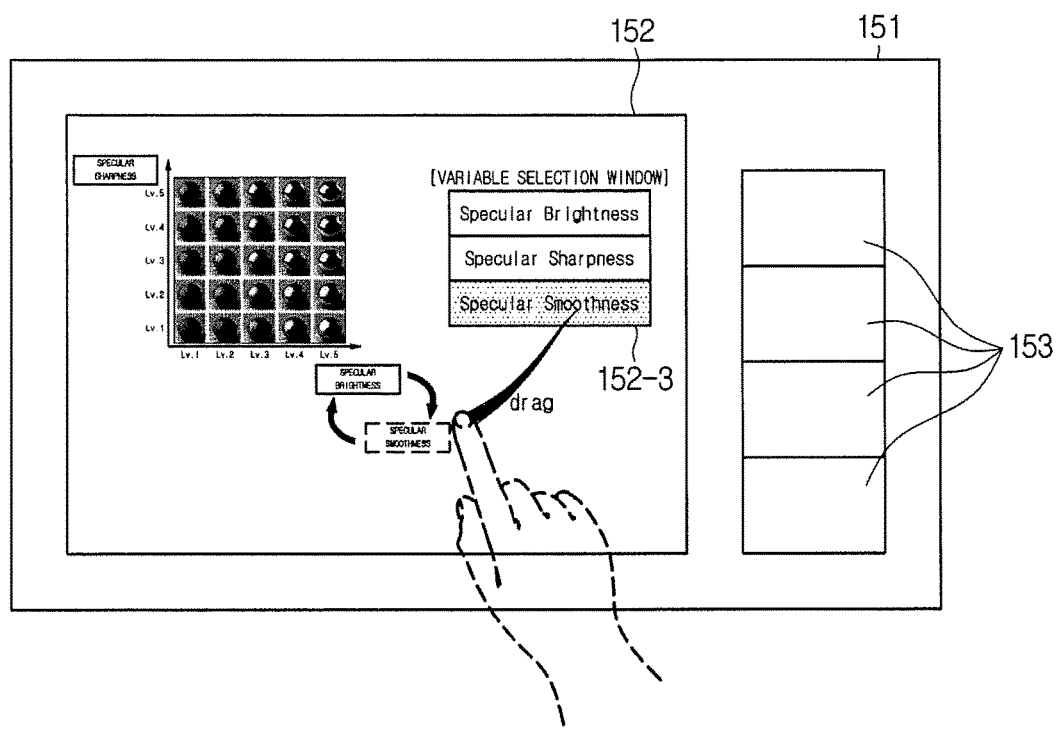
FIG. 9 is a screen illustrating a touch screen to change or select variables related to specular characteristics in accordance with an embodiment of the present disclosure.

FIG. 9 is a screen illustrating a touch screen to change or select variables related to specular characteristics in accordance with an embodiment of the present disclosure.

As mentioned above, the kind of variables related to the specular characteristics of a 3D ultrasound image is not limited thereto, and any kind of variables related to the specular characteristics may be selected and applied. As illustrated in FIG. 9, when the variables related to the specular characteristics may be set to the specular sharpness and the specular brightness, the specular brightness variable may be replaced by the specular smoothness variable 152-3. A variable may be replaced by dragging a variable, which is to be set, from a variable selection screen configured to select variables related to the specular characteristics described in FIGS. 4A-4C, to the touch screen 152. A user may directly replace a variable on the touch screen 152 so that variables related to the specular characteristics to be applied to a 3D ultrasound image may be quickly and intuitively selected and set. On a screen on the touch screen 152, variables of X- and Y-axes may be replaceable, and all of variables may be replaceable on a screen displaying objects in which a combination of two variables is applied, or a screen to allow a single variable to be adjusted. In addition to dragging, the variables may be replaced by touching variable values on a coordinate axis in which objects are displayed, or by touching variables displayed on the variable selection window. The variables may be replaced and selected by using the mechanical input unit 153. By replacing or selecting variables, a variable value intended to be applied to a 3D ultrasound image may be precisely applied.

Figure 10:
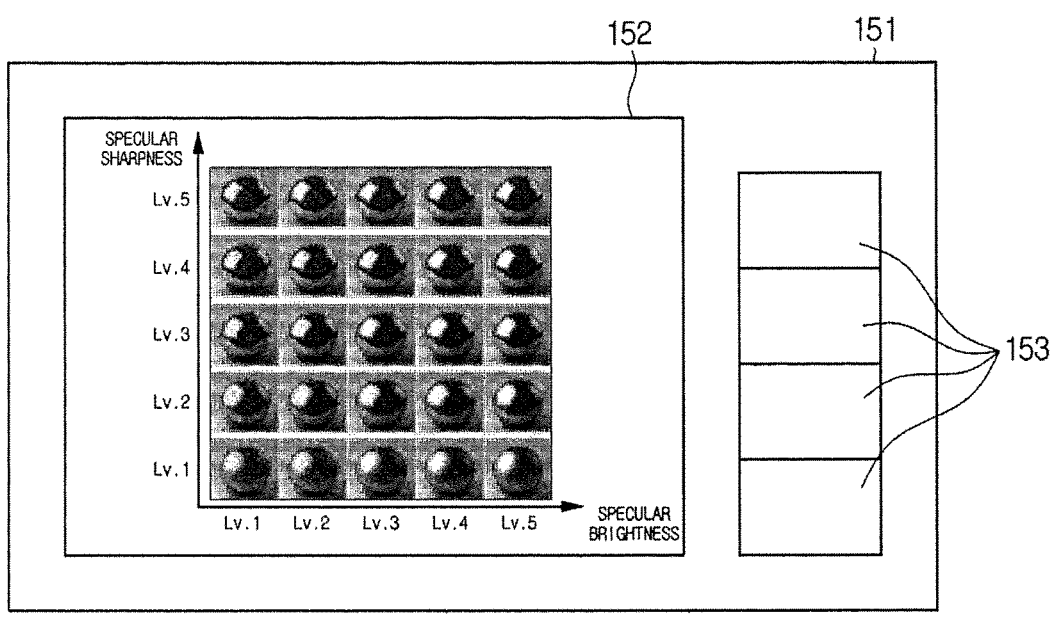
FIG. 10 is a screen illustrating a specular brightness variable replaced with a specular smoothness variable when a specular bright value among variables related to specular characteristics is fixed to a certain value in accordance with an embodiment of the present disclosure.
Figure 11:
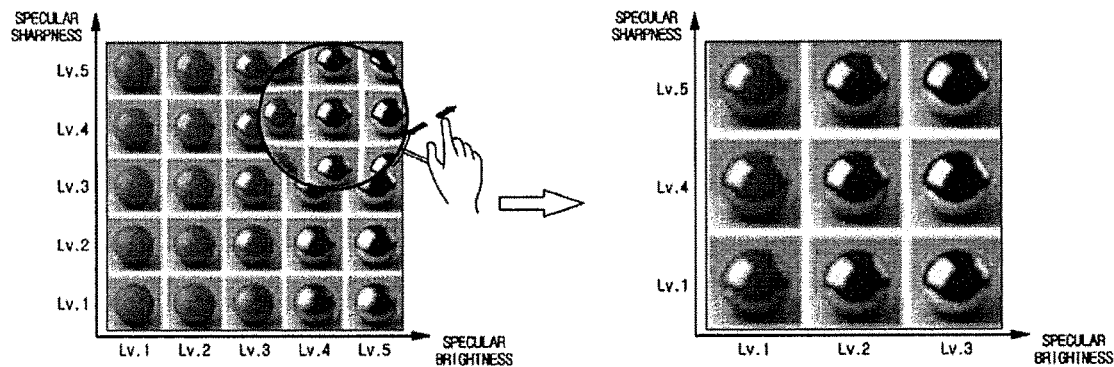
FIGS. 11A and 11B are screens illustrating expansion and contraction of at least one objects in which a combination of two variables related to specular characteristics is applied.
Figure 11:
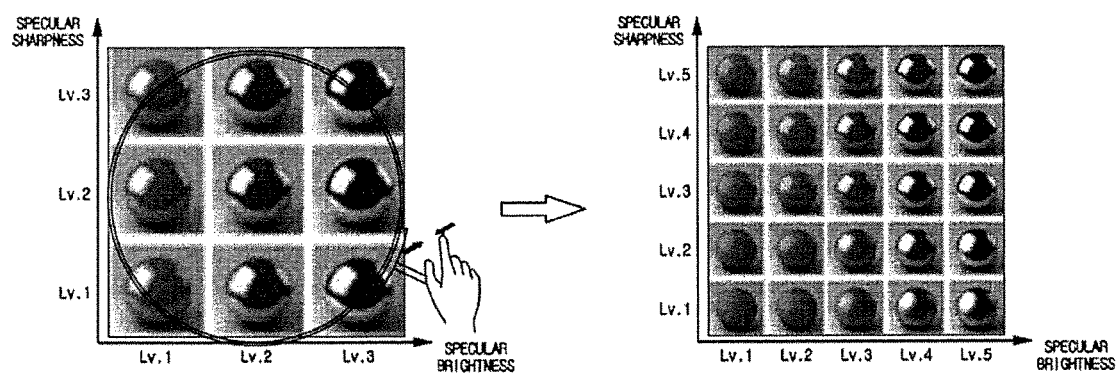

FIG. 10 is a screen illustrating a specular brightness variable changed to a specular smoothness variable when a specular brightness value is fixed to a certain value among variables related to specular characteristics in accordance with an embodiment of the present disclosure.

As illustrated in FIG. 10, variables of X-axis in a plurality of objects displayed on the touch screen 152 may be set to a specular smoothness. FIG. 10 illustrates a screen displaying objects in which specular brightness variables of X-axis is replaced to specular smoothness variables from a case a specular sharpness and a specular brightness are set to variables, as illustrated in FIG. 5. Since replacing variables related to the specular characteristics was illustrated in FIG. 9, a description of the same part as those shown in FIG. 9 will be omitted. According to an embodiment of the present disclosure, when the specular brightness variable is replaced to the specular smoothness variable in a case when the specular brightness variable value is set to Lv. 4, as illustrated in FIG. 5, object values, in which the specular smoothness variable value is changed in a case when the specular brightness value is fixed to Lv. 4, may be displayed on the touch screen 152.

Referring to FIG. 10, when the specular brightness is fixed to Lv.4 and the specular sharpness is changed from Lv. 1 to Lv. 5, a screen in which the specular smoothness is changed from Lv. 1 to Lv. 5 may be displayed. As mentioned above, the specular smoothness may represent a variable indicating a degree of roughness or smoothness of a subject image of a 3D ultrasound image, and may be a variable related to the texture of a 3D ultrasound image. In FIG. 10, the surface texture of a sphere on the subject may be changed from roughness to smoothness as the specular smoothness of X-axis is changed from Lv. 1 to Lv. 5. That is, a 3D ultrasound image may be displayed as the least smooth when the specular smoothness is Lv. 1 and a 3D ultrasound image may be displayed as the smoothest when the specular smoothness is Lv. 5. As illustrated in FIG. 10, in a case when any one variable related to the specular characteristics is fixed, other variable values may be applied.

FIGS. 11A and 11B are screens illustrating expansion and contraction of at least one objects in which a combination of two variables related to specular characteristics is applied.

As illustrated in FIGS. 8A and 8B, variables related to the specular characteristics may be set in X- and Y-axes. At this time, there is no limitation to set variable levels to be divided, and thus the variable may be set to be divided into large number of levels or small number of levels. At this time, when the variable value is set to be divided into the large number, a variable value related to the specular characteristics may be applied by being slightly adjusted, but a user may not clearly see a shape of object, in which the specular characteristics is applied, due to the number of displayed object is too large. Conversely, when the variable value is set to be divided into the small number, a user may clearly see a shape of object, in which the specular characteristics is applied, but there may be limitation to slightly adjust a variable value related to the specular characteristics due to a narrow range of the variable value. Therefore, when the variable value is set to be divided into the large number, at least one part of the object, in which the specular characteristics thereof are intended to be seen specifically, may be correctly observed on an expanded screen by expanding a part of the object, and a variable value or a combination of variables may be selected and applied. Conversely, when the variable value is set to be divided into the small number, specular characteristics applied to a plurality of objects may be recognized on a screen displaying a large number of objects by contracting a part of at least one object.

As illustrated in FIG. 11A, when the specular brightness and the specular sharpness variable value are set to be divided into from Lv. 1 to Lv. 5, the specular characteristics of a part from Lv. 3 to Lv. 5 may be accurately recognized and selected by expanding a screen. When a user takes a gesture of expanding a screen with fingers, as illustrated in FIG. 11A, by touching a part of an object in which the specular brightness and the specular sharpness variable value are set to from Lv.3 to Lv. 5, respectively, on the left screen of FIG. 11A, corresponding part of the object may be expanded and a screen displaying an object within a range of from Lv. 3 to Lv. 5 may be displayed as illustrated in the right side screen. In FIG. 11A, the expansion may be performed on three steps of level of the specular brightness and the specular sharpness, but is not limited thereto.

Conversely, as illustrated in FIG. 11B, when the specular brightness and the specular sharpness variable value are set to be divided into from Lv. 3 to Lv. 5, the specular characteristics may be recognized on a screen displaying variable values of from Lv.1 to Lv.5 by contracting a screen. At the left side of FIG. 11B, when a use takes a gesture of contracting a screen with fingers by touching an entire object, a screen displaying multiple objects in from Lv. 1 to Lv. 5 may be displayed as illustrated in the right side of FIG. 11B while a size of an object is reduced. A user may recognize an object screen displaying the specular variable of from Lv. 1 to Lv. 5 on the right side screen in which the size of the object is reduced and specular variable level values are displayed to be divided into the large number of steps.

Figure 12A:
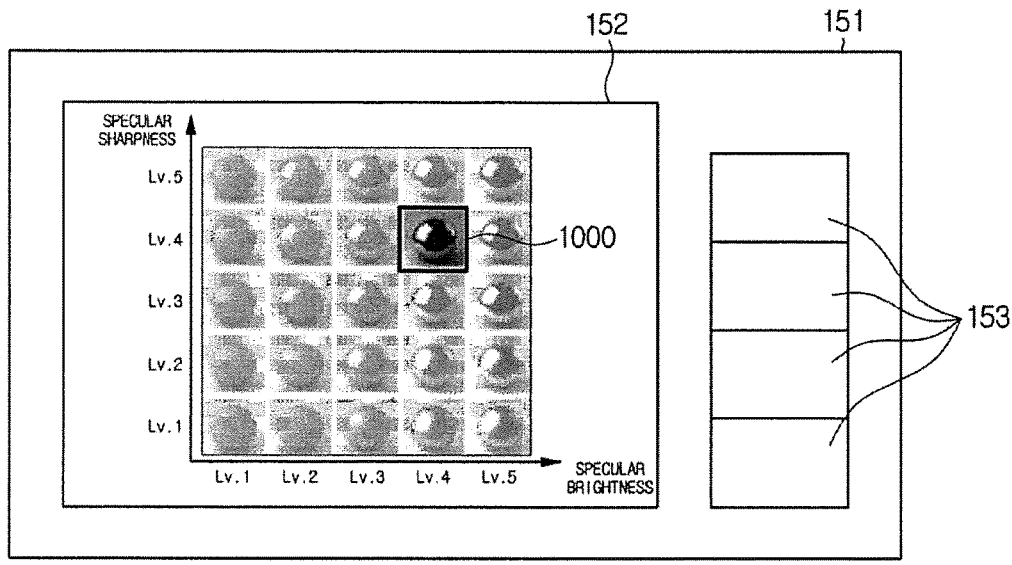
FIGS. 12A and 12B are screens illustrating a pre-stored object in which a specular characteristic proper for an ultrasound image is applied, in accordance with an embodiment of the present disclosure.
Figure 12B:
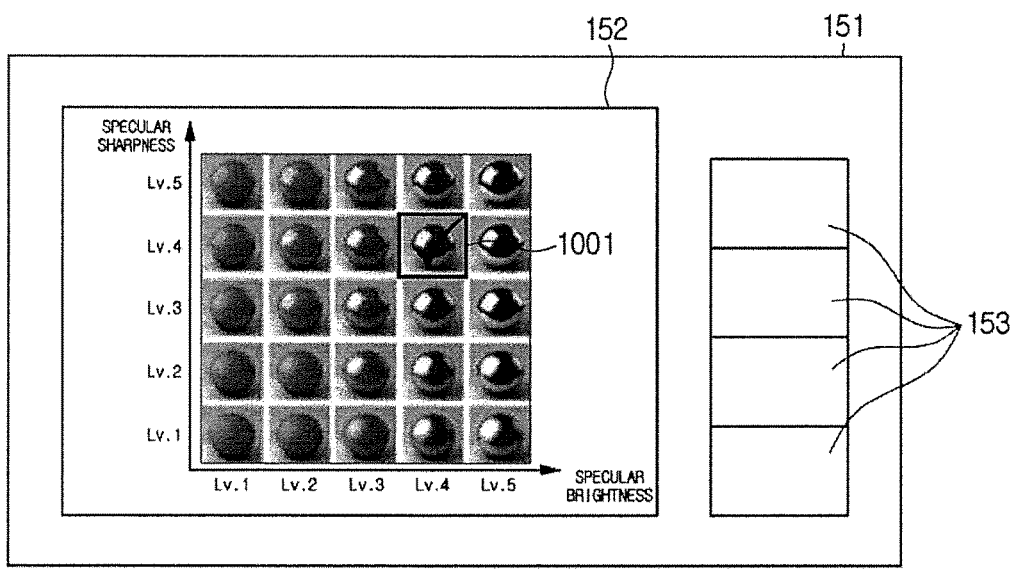

FIGS. 12A and 12B are screens illustrating a pre-stored object in which a specular characteristic proper for an ultrasound image is applied, in accordance with an embodiment of the present disclosure.

Since the most proper combination of variables related to specular characteristics may be predetermined according to the kind of ultrasound image, a combination of variables intended to be applied to an ultrasound image may be predetermined and the predetermined combination may be directly selected when corresponding ultrasound image is outputted. As illustrated in FIG. 12A, in a case when a combination of the specular brightness and the specular sharpness variable value intended to be applied to a certain ultrasound image outputted from the display unit 160 may be Lv. 4 of specular brightness and Lv. 4 of specular sharpness, the combination may be stored in the memory unit 600. Therefore, when corresponding ultrasound image is outputted, the processor 400 may recognize the combination of variable values stored in the memory unit 600 and may display on an object on the touch screen 152. FIGS. 12A and B illustrate a shape of the object displayed on the touch screen 152. As illustrated in FIG. 12A, an object 1000 in which corresponding combination of variable is applied may be clearly displayed and the other objects may be displayed to be blurred. As illustrated in FIG. 12B, an object 1001 in which corresponding combination of variable is applied may be displayed with a certain indicator, such as a check mark, but the method of displaying an object in which corresponding combination of variable is applied is not limited thereto. A user may touch the displayed object 1000 and 1001 so that the predetermined combination value of variables related to the specular characteristics may be directly applied to corresponding ultrasound image.

Figure 13A:
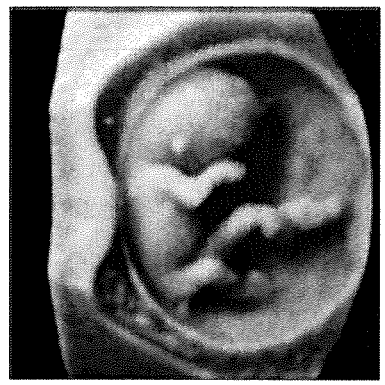
Figure 13B:

FIGS. 13A and 13B are screens illustrating a 3D ultrasound image in which a combination of variables related to specular characteristics is applied.

As illustrated in FIG. 13A, as for an ultrasound image of the fetus, the fetus of FIG. 13B is displayed to be clearer than that of FIG. 13B. That is, according to an embodiment of the present disclosure, the higher specular sharpness variable among variable related to specular characteristics may be applied to an ultrasound image so that a clear and realistic ultrasound image may be outputted.

As is apparent from the above description, multiple specular characteristics values of a 3D ultrasound image may be selected and inputted at a time so that a user may intuitively and easily adjust the specular characteristics and an input time may be reduced. In addition, as for a user, an initial learning time to learn the meaning of the specular characteristics values may be reduced. The specular characteristics may be easily and quickly changed so that factual information about a 3D ultrasound image may be delivered to a user.

Hereinbefore an input apparatus and a medical imaging apparatus having the same are illustrated with reference to the drawings. An example of an input apparatus and a medical imaging apparatus are not limited thereto.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An input apparatus for medical imaging, comprising:
an input configured to receive a command related to operations of a medical imaging apparatus from a user;
a touch screen configured to display a plurality of target objects having different variables related to specular characteristics of a medical image, which is outputted from the medical imaging apparatus; and
an image processor configured to determine the specular characteristics by tracing a path of light of each pixel included in the medical image and calculating a light effect of the light,
wherein the touch screen displays the plurality of target objects as three-dimensional images entirely on one screen,
wherein the touch screen receives a selection of one of the plurality of target objects,
wherein the different variables of the plurality of target objects are displayed as a combination on a Cartesian coordinate system on the touch screen so that an x-axis represents one specular characteristics of the medical image and a y-axis represents another specular characteristics of the medical image, and
wherein the specular characteristics comprises specular brightness, specular sharpness, specular smoothness, and specular roughness.

2. The input apparatus of claim 1, wherein
when any one of the plurality of target objects is touched, the touch screen receives at least one variable value among the different variables related to the specular characteristics applied to the touched target object.

3. The input apparatus of claim 1, wherein
the touch screen displays the medical image in which a combination of at least one variable among the different variables related to the specular characteristics is applied, and displays at least one variable value applied to the medical image.

4. The input apparatus of claim 1, wherein
when a command of changing a variable among different variables is inputted by the user, the touch screen displays the plurality of target objects by changing the variable related the specular characteristics of the medical image.

5. The input apparatus of claim 4, wherein
the variable is dragged on the touch screen or selected by touching the variable by the user.

6. The input apparatus of claim 1, wherein
when a command of enlarging is inputted by the user, the touch screen displays at least one first target object by enlarging the at least one first target object corresponding to the command of enlarging, and
when a command of reducing is inputted, the touch screen displays at least one second target object by reducing the at least one second target object corresponding to the command of reducing.

7. The input apparatus of claim 1, wherein
the touch screen displays a target object among the plurality of target objects, to which the specular characteristics appropriate for the medical image is applied, to be distinguished from the rest of the plurality of target objects.

8. The input apparatus of claim 1, wherein
the input comprises buttons to adjust the different variables related to the specular characteristics of the medical image.

9. A medical imaging apparatus comprising:
an input apparatus including: an input configured to receive a command related to operations of medical imaging from a user; a touch screen configured to display a plurality of target objects having different variables related to specular characteristics of a medical image, which is outputted by the user's operation; and an image processor configured to determine the specular characteristics by tracing a path of light of each pixel included in the medical image and calculating a light effect of the light; and a display configured to display, when a target object is selected among the plurality of target objects displayed on the touch screen, the medical image in which the specular characteristics corresponding to the selected target object is applied, wherein the touch screen displays the plurality of target objects as three-dimensional images entirely on one page of the touch screen, wherein the touch screen receives a selection of one of the plurality of target objects, wherein the different variables of the plurality of target objects are displayed as a combination on a Cartesian coordinate system on the touch screen so that an x-axis represents one specular characteristics of the medical image and a y-axis represents another specular characteristics of the medical image, and wherein the specular characteristics comprises specular brightness, specular sharpness, specular smoothness, and specular roughness.

10. The medical imaging apparatus of claim 9, wherein when any one of the plurality of target objects is selected, the touch screen receives at least one variable value among the different variables related to the specular characteristics applied to the selected target object.

11. The medical imaging apparatus of claim 9, wherein the touch screen displays the medical image in which a combination of at least one variable among the plurality of variables related to the specular characteristics is applied, and displays at least one variable value applied to the medical image.

12. The medical imaging apparatus of claim 9, wherein when a command of changing a variable among the different variables is inputted, the touch screen displays the plurality of target objects by changing the variable related the specular characteristics of the medical image.

13. The medical imaging apparatus of claim 12, wherein the variable is dragged on the touch screen or selected by touching the variable by the user.

14. The medical imaging apparatus of claim 9, wherein when a command of enlarging is inputted, the touch screen displays at least one first target object by enlarging the at least one first target object corresponding to the command of enlarging, and when a command of reducing is inputted, the touch screen displays at least one second target object by reducing at least one second object corresponding to the command of reducing.

15. The medical imaging apparatus of claim 9, wherein the touch screen displays a target object, to which the specular characteristics appropriate for the medical image is applied, to be distinguished from the rest of the plurality of target objects.

16. The medical imaging apparatus of claim 9, wherein the is a mechanical input unit including buttons to adjust different variables related to the specular characteristics of the medical image.

17. The medical imaging apparatus of claim 9, further comprising:

a memory configured to store at least one variable among the different variables or a combination of the different variables and data related to the touch screen displaying the plurality of target objects.

* * * * *